Nov. 10, 1931.  M. W. ARROWOOD  1,831,087
APPARATUS FOR AND PROCESS OF FEEDING POWDERED FUEL
Filed March 14, 1923   6 Sheets-Sheet 1
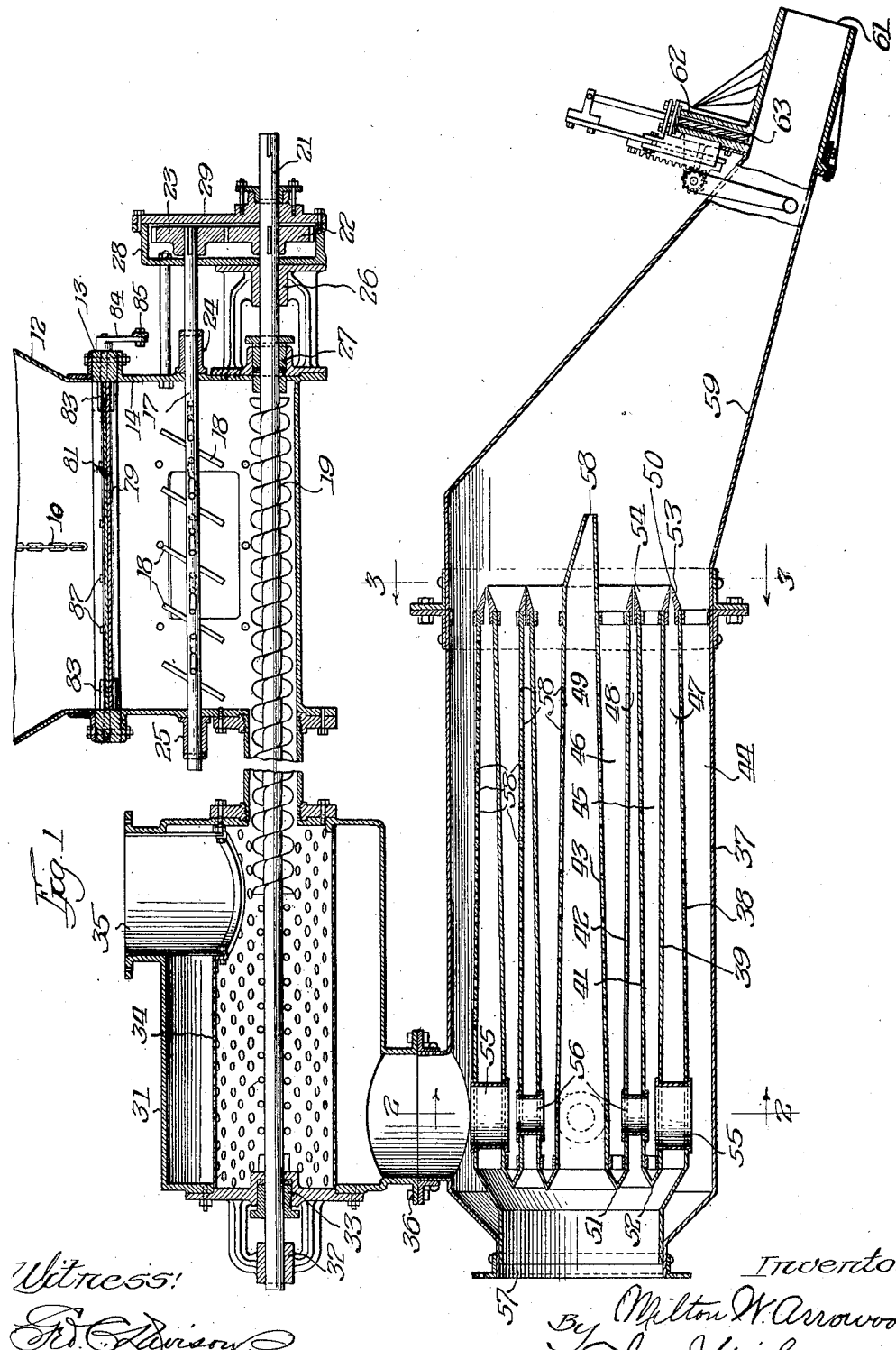

Nov. 10, 1931.  M. W. ARROWOOD  1,831,087
APPARATUS FOR AND PROCESS OF FEEDING POWDERED FUEL
Filed March 14, 1923  6 Sheets-Sheet 2
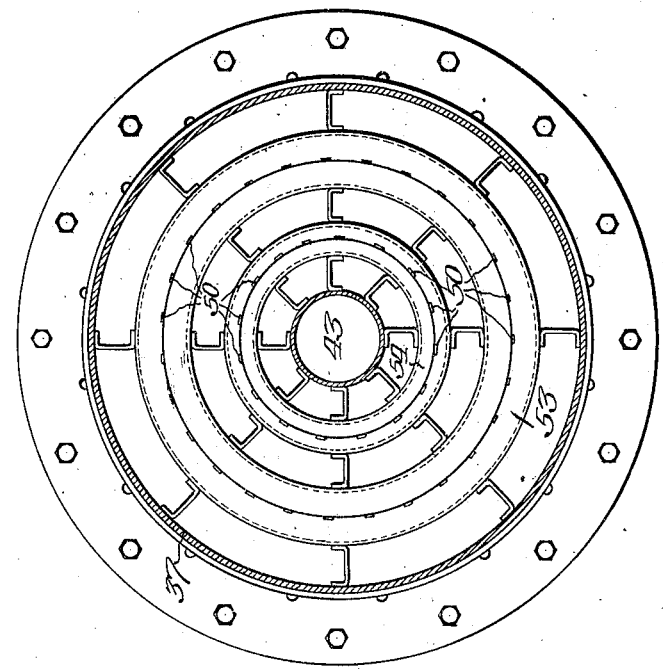
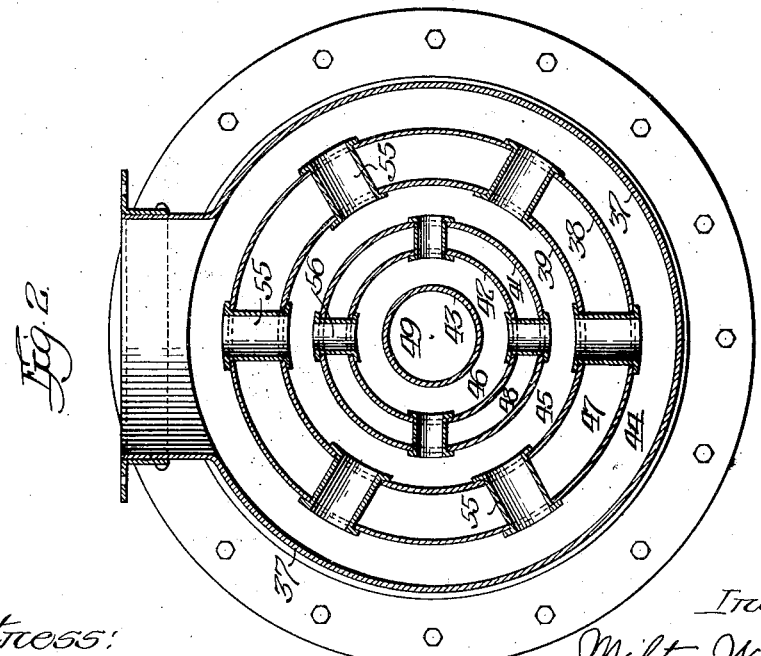

Nov. 10, 1931.          M. W. ARROWOOD          1,831,087
APPARATUS FOR AND PROCESS OF FEEDING POWDERED FUEL
Filed March 14, 1923      6 Sheets-Sheet 3
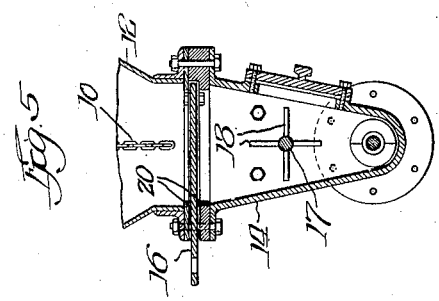
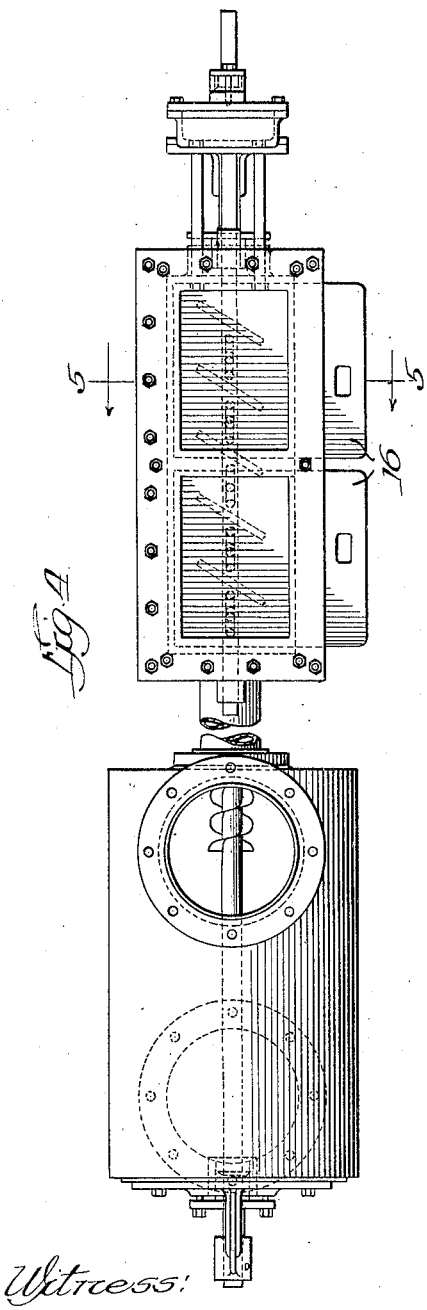
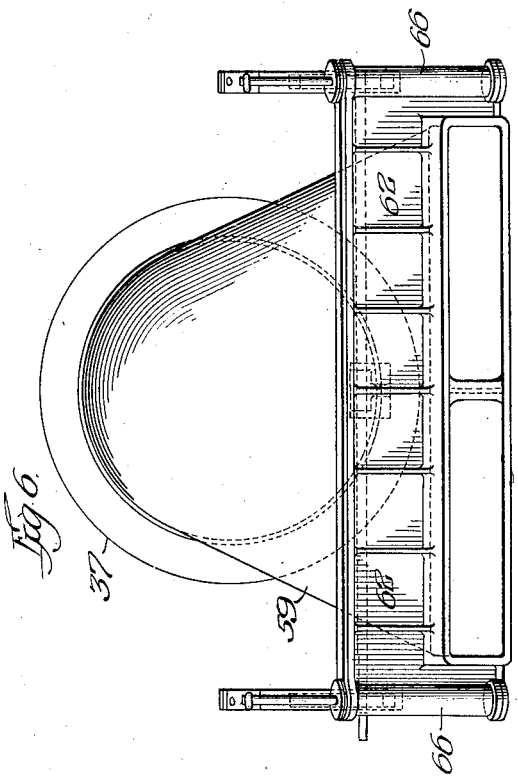

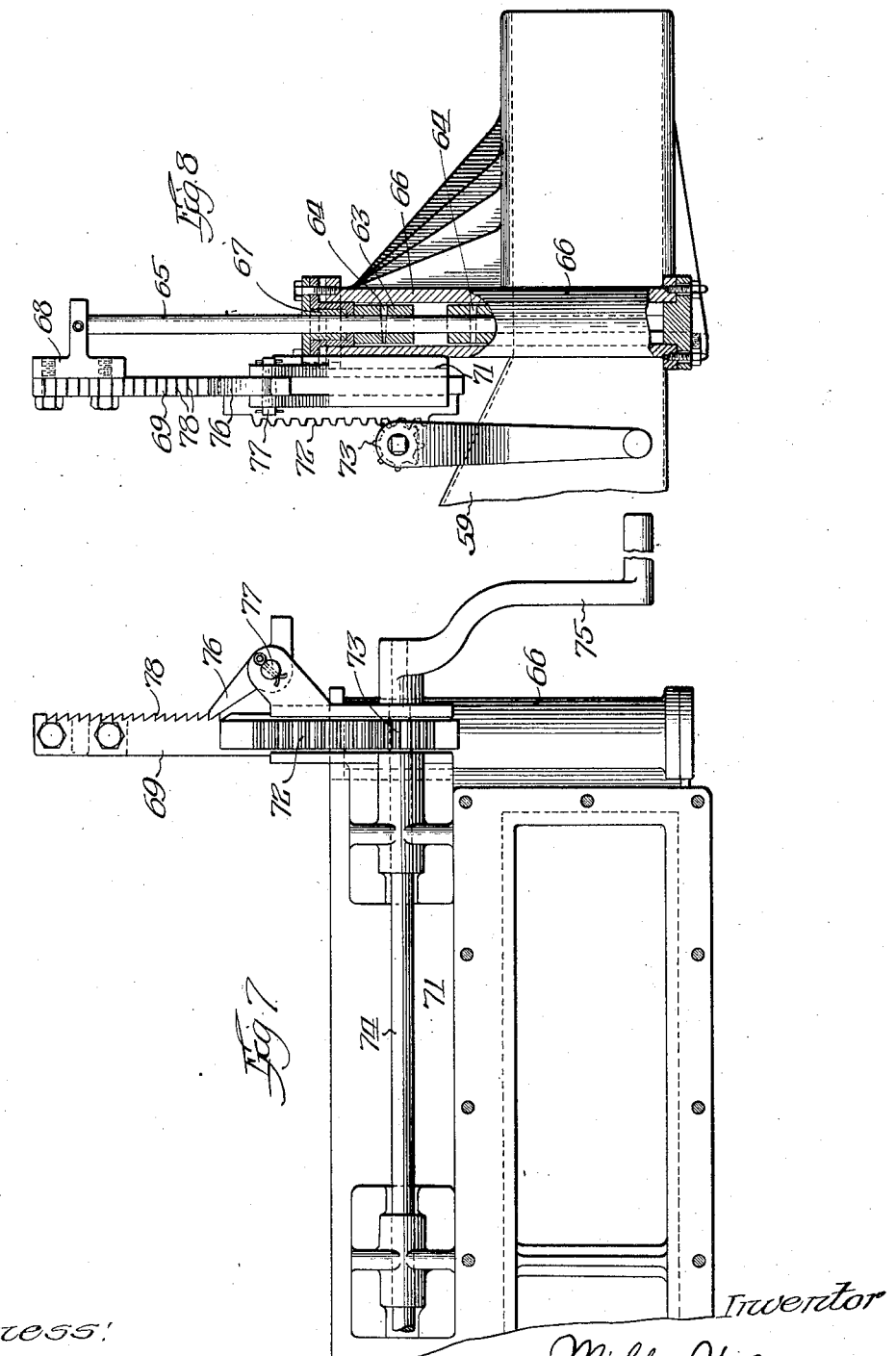

Nov. 10, 1931.  M. W. ARROWOOD  1,831,087
APPARATUS FOR AND PROCESS OF FEEDING POWDERED FUEL
Filed March 14, 1923  6 Sheets-Sheet 5
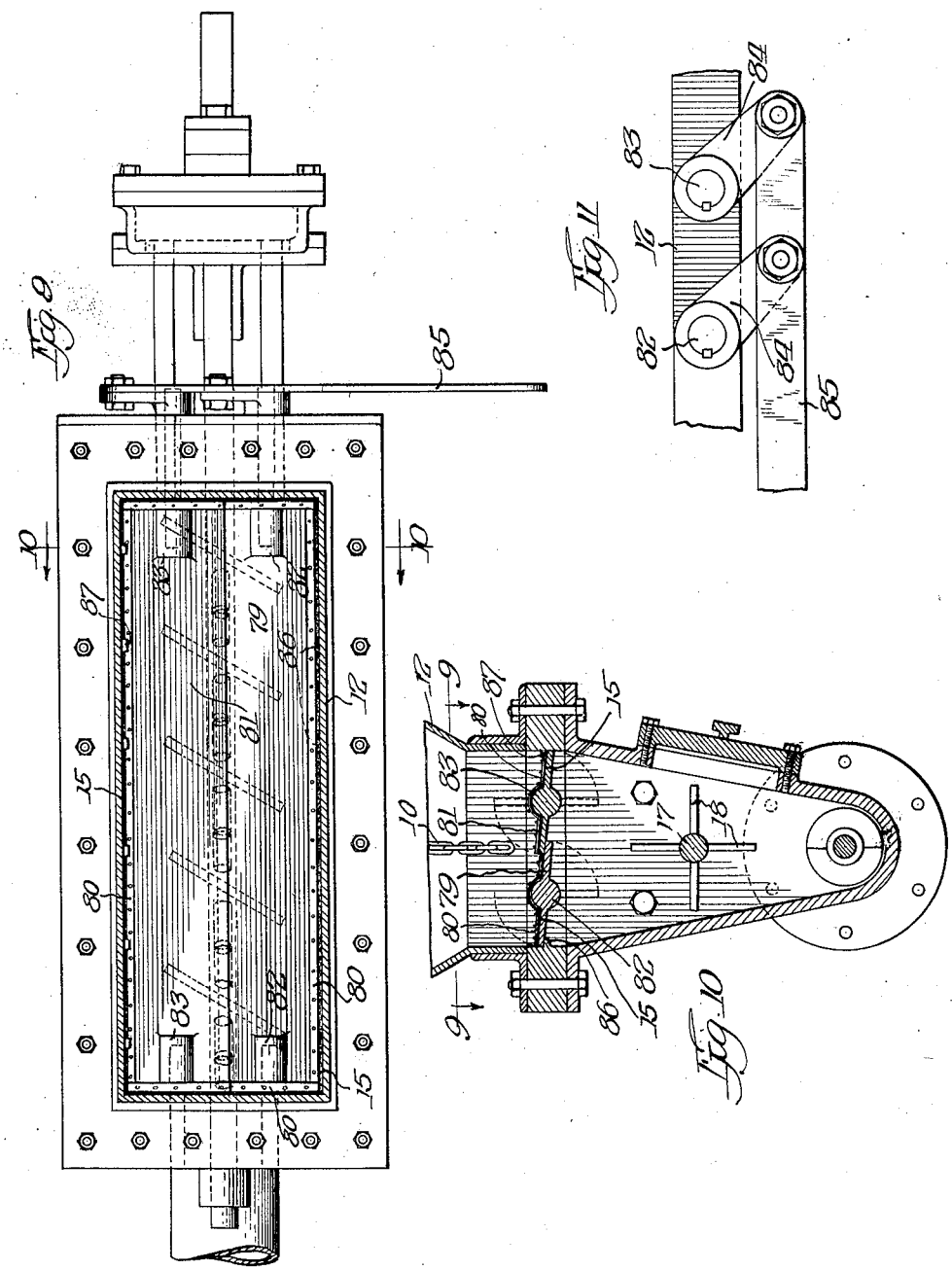

Nov. 10, 1931.  M. W. ARROWOOD  1,831,087
APPARATUS FOR AND PROCESS OF FEEDING POWDERED FUEL
Filed March 14, 1923   6 Sheets-Sheet 6
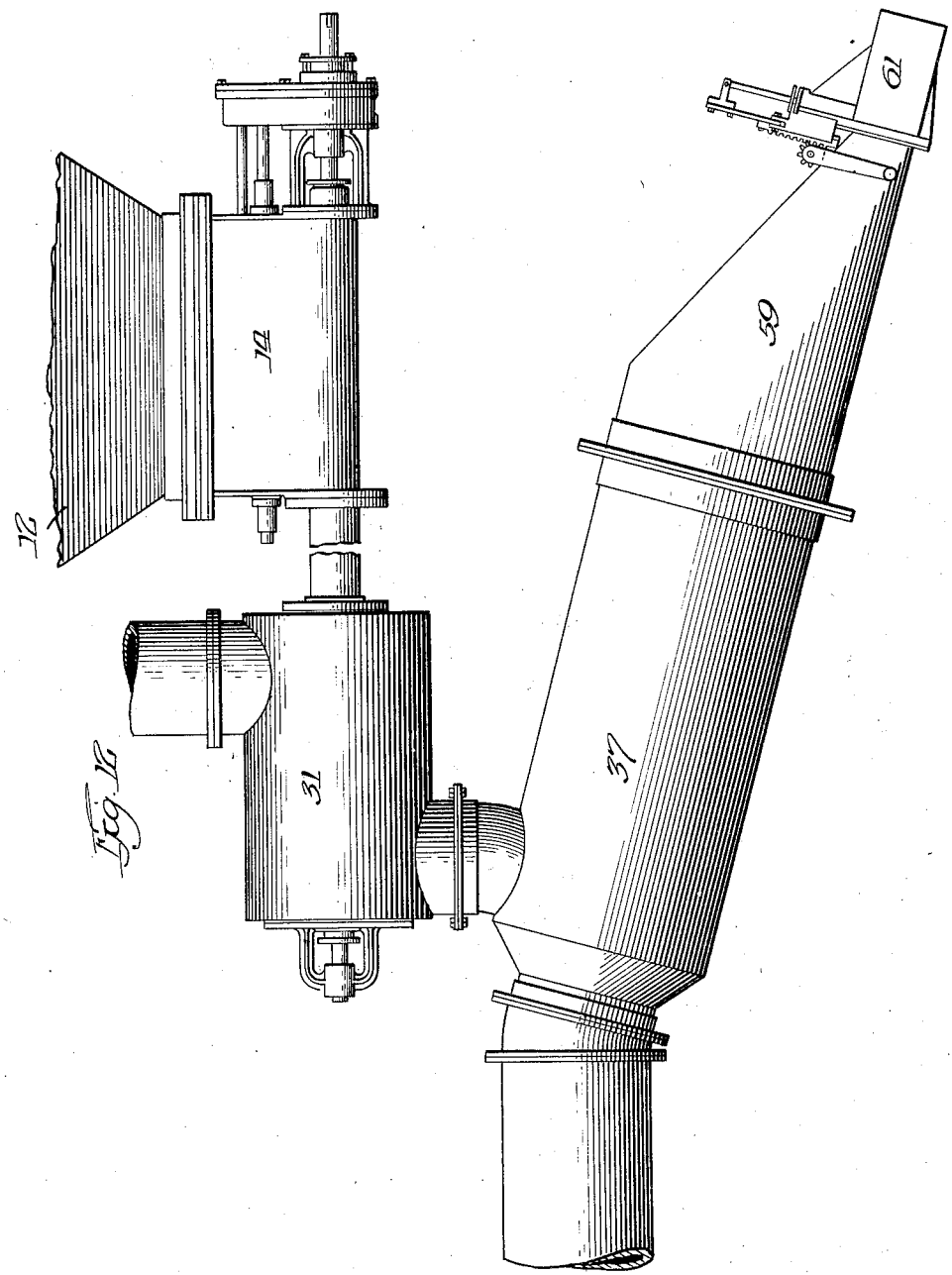

Patented Nov. 10, 1931

1,831,087

UNITED STATES PATENT OFFICE

MILTON W. ARROWOOD, OF WORCESTER, MASSACHUSETTS

APPARATUS FOR AND PROCESS OF FEEDING POWDERED FUEL

Application filed March 14, 1923. Serial No. 624,927.

This invention relates to the feeding of powdered coal and other combustible material, and particularly to the apparatus for delivering the same to the point of use, and for thoroughly admixing therewith the requisite amount of air to support complete combustion, the present apparatus being in the nature of an improvement upon that disclosed in prior Patent No. 1,355,444, granted October 12, 1920.

An object of the invention is to improve the construction and operation of the burner in which the coal is admixed with the requisite proportions of air. To this end, my invention contemplates annular conduits through which the coal passes, these conduits being of increasing area from their receiving to their delivery end, thereby permitting an expansion and a rarification of the mixture of air and coal during its passage therethrough. Furthermore, the air supply conduits from which air is delivered from within the fuel outwardly into the fuel to disperse the same are of decreasing cross-sectional area from their intake to their delivery ends, so that the air pressure in the conduits throughout the length of the mixer is maintained substantially uniform, and the pressure therefore does not drop off as the delivery end of the mixer is reached.

Other objects and advantages of this invention should be readily appreciated as the same becomes better understood by reference to the following description, when considered in connection with the accompanying drawings.

Referring to the drawings:

Fig. 1 is chiefly a vertical sectional view through an apparatus embodying my invention;

Figs. 2 and 3 are transverse sectional views through the mixer taken on the lines 2—2 and 3—3 of Fig. 1;

Fig. 4 is a plan view of a modified form of the coal feeding and preliminary mixing apparatus;

Fig. 5 is a sectional view on the line 5—5 of Fig. 4;

Fig. 6 is an end view looking at the mixer and burner;

Fig. 7 is an enlarged view showing one end of the burner gate controlling mechanism;

Fig. 8 is a view looking toward the left at Fig. 7, certain parts being shown in section;

Fig. 9 is a plan view of one end of the coal feeding and preliminary mixing apparatus, taken on the line 9—9 of Fig. 10;

Fig. 10 is a sectional view on the line 10—10 of Fig. 9;

Fig. 11 is a fragmentary view of the mechanism for operating the control gates shown in Figs. 9 and 10; and Fig. 12 is a side elevation of a modified form of the apparatus.

Referring now to the drawings more in detail, reference character 12 indicates the lower portion of a hopper in which the powdered coal is stored, and from which it is fed, this hopper being connected by a closed joint 13 with a tapered trough or receptacle 14, into which the powdered material falls by gravity from the hopper when the control gates are open. The gates 79 and 81 (Figs. 1, 9, 10 and 11) are mounted on shafts 82 and 83, respectively, extending through the walls of the hopper base, and journaled in outboard bearings. Each shaft is provided outside the hopper with an arm 84, which arms are connected by an operating link 85. It will be manifest that by moving the link 85 longitudinally, rotative movements will be imparted to the shafts 82 and 83 to open and close the gates. It will be observed from Fig. 10 that a stop ledge 86 is disposed beneath the outer edge of gate 79, and a similar stop 87 is disposed above the outer edge of gate 81, whereby the movements of these gates in one direction are limited. The inner edges of the gates overlap when in closed position, so that when the gates are positioned as shown in Fig. 10, the flow of fuel from the hopper is completely shut off. By rotating the gates in a clockwise direction, viewing Fig. 10, they may be opened or partially opened to any desired degree to permit the requisite flow of fuel from the hopper. To ensure a tight fit, the margin of each gate is provided with a felt strip 15 held in place by a companion strip 80 opposed to the walls.

In Figs. 4 and 5 a plurality of sliding gates 16 are shown, which may be employed in lieu of the swinging gates previously explained, and obviously, the number of gates may be increased or diminished in accordance with the size of the hopper and the apparatus to which the coal is delivered. In this instance also felt sealing strips 20 around the gates are employed to preclude leakage.

The tapered shape of the hopper induces a tendency of the coal in the hopper to form an arch over the gate or gates so that it will not feed uniformly. This objectionable arch, however, may be obviated by suspending within the hopper one or more heavy chains 10 which hang down to a point in proximity to the gate. The constant vibration of such a chain or chains resulting from the operation of the machinery prevents this objectionable arching of the coal.

Beneath the gate, within the trough 14 and above the bottom thereof, there is mounted a rotatable shaft 17 provided with radially extending spokes or fingers 18, preferably inclined with respect to the longitudinal axis of said shaft and adapted upon rotation of the shaft to agitate the coal passing through the trough, thereby breaking any caked lumps or chunks therein and mixing the same so as to ensure a uniformity in the consistency and specific gravity of the fuel, as well as facilitating the feeding of the coal to the feed screw 19 disposed in the bottom of the trough. This feed screw is mounted upon a shaft 21 driven from any suitable source of power and equipped with a gear 22, which meshes with and drives a companion gear 23 on the shaft 17. In order to prevent leakage of the coal around the shafts and to preclude its entrance as much as possible into the bearings, the shaft 17 is mounted in outboard bearings 24 and 25, and shaft 21 is mounted at one end in an outboard bearing 26, and extends through stuffing boxes 27 by which leakage of coal around the shaft is precluded. The gears 22 and 23 are further protected from coal dust by a housing 28 surrounding the same, the outer plate 29 of which may be made removable, to permit access to the gears.

The spokes or fingers 18 being inclined as shown with respect to the longitudinal axis 17 and being arranged in a plurality of angularly positioned axial planes a result is obtained in the breaking up of the packed fuel which is very effective.

The other end of shaft 21 extends through a shell 31 and is journaled in an outboard bearing 32, leakage at this end of the shaft being prevented by a stuffing box 33. Within the shell 31 there is disposed around the shaft a perforated cylinder 34, into which the coal is delivered by the feed screw 19. Air under suitable pressure is delivered to the interior of the cylinder 34 through a supply pipe 35, and this air is mixed with the coal in the cylinder, the mixture being further facilitated by the passage of the coal and air together outwardly through the perforations in the cylinder walls. From the shell 31 the mixed coal and air are discharged through a neck 36 into the mixer proper, or as it is commonly termed, the burner.

The burner comprises an outer cylindrical shell 37 within which is disposed a plurality of concentrically arranged shells 38, 39, 41, 42, and 43, each of progressively decreasing diameter. These shells, arranged as shown, form a plurality of mixing conduits or passages 44, 45, and 46, alternating with the air supply conduits 47, 48, and 49. The mixing conduits 46 and 45 are closed at the intake or left-hand end, viewing Fig. 1, by tapered closure rings 51 and 52, which offer minimum resistance to the passage of air into the air conduits. The air conduits 47 and 48 are closed at their delivery ends by similar tapered rings 53 and 54, the peripheral tips of these rings being provided with slot openings 50 (see Fig. 3) spaced at suitable intervals around their circumferences so as to make the air conduits self-cleaning of any dust that may fall into these conduits. These tips also afford minimum delivery resistance to air and mixture flow. Mixing passages 44, 45 and 46 communicate, one with another, at their intake ends through nipples 55 and 56, and the coal and air delivered from the shell 31 enter the various mixing conduits through these nipples so that the mixture is distributed to all of the mixing conduits.

Air under suitable pressure is delivered from a blower or other pressure producer through the open supply end 57 into the mixer, and this air, under pressure, enters the various air conduits 47, 48, and 49. The outer wall of each of these air conduits is provided with a series of discharge orifices 58, which may be either formed in the shape of small nozzles or may be simply perforations in the walls, as shown in the drawings. The air is therefore discharged radially outwardly in the form of jets or streams into each mixing conduit, transversely to the direction of flow of the mixture therethrough, with the result that the fuel is thoroughly agitated and mixed, and commingled with the air to produce a uniform mixture of air and fuel in which each fuel particle is completely surrounded with sufficient air to support complete combustion. It is to be noted that the jets or streams of air passing from the orifices in the containing walls of the air conduit proceed in an outward direction at an angle inclined to the direction of movement of the fuel. Due to the motion of the fuel the jets of air emanating from the orifices will tend to modify the flow of fuel, the jets themselves being deflected in the direction of flow of the fuel. Thus although the jets may initially enter the surrounding fuel at a certain inclination, the jet as it continues to penetrate the surrounding fuel will not necessarily retain its original direction.

For the purpose of permitting the mixture to expand during its passage through the mixer and thereby become more rarified, the mixing conduits 44, 45, and 46 are tapered so that their cross-sectional areas increase from the intake to the delivery ends thereof. In order to maintain a uniformity of pressure, so that the air jets toward the delivery end of the mixer will be substantially as strong as those near the intake end, the air conduits 47, 48, and 49 are also tapered, but in a reverse direction, with the result that their cross-sectional areas diminish from the intake to the delivery ends thereof. The delivery ends of the air conduits 47 and 48 are completely closed except for the peripherally spaced self-cleaning slots, by the tapered rings 53 and 54, as previously mentioned, and the delivery or right-hand end, viewing Fig. 1, of the central air conduit 49, is provided with a discharge orifice 58 adapted to deliver a thin jet of air longitudinally into the tapered conduit 59 leading to the burner. This jet assists in the delivery of the mixture to the burner nozzle, and also further agitates the flowing stream of mixture, thereby augmenting the thorough commingling of the air with the fuel particles.

The delivery conduit 59 delivers the mixture to the flat nozzle 61, from which it issues into the combustion chamber of the furnace or fuel box with which the apparatus is connected. For the purpose of closing off the burner to protect the same from the radiant heat of the combustion chamber whenever necessary, I have provided a control gate and operating mechanism, which will now be described. Referring particularly to Figs. 1, 6, 7, and 8, it will be observed that at the juncture of the conduit 59 and the nozzle 61, there is provided an upwardly extending housing or gate guiding compartment 62, in which there is slidably disposed a slide gate 63, secured at its ends by pins 64, or otherwise, upon supporting rods 65 extending into cylinders 66 formed at each end of the housing 62. These rods project upwardly through stuffing boxes 67 and are connected at their upper ends through brackets 68 with vertically movable actuating members 69 adapted to reciprocate in guideways 71 mounted on the cylinders. Each member 69 is provided with rack teeth 72 adapted to mesh with a pinion 73 mounted on a shaft 74 extending transversely of the burner. This shaft may be rotated by means of a crank 75 attached to one end thereof, and it will be obvious that upon rotation of the shaft the control gate will be raised or lowered, depending upon the direction of rotation of the shaft. To hold the gate in any vertical position to which it may have been adjusted through manipulation of the crank 75, a pawl 76 is pivoted at 77 adjacent one of the members 69, which is provided on one side with teeth 78 with which the pawl negotiates to lock the gate in adjusted position. When the gate is in full opened position, as shown in Figs. 1 and 8, the full capacity of the burner will be utilized, but when the burner is wholly or partially shut down, the gate may be correspondingly closed to prevent the entrance of radiant heat from the combustion chamber into the interior of the burner.

It will be observed that the burner shown in Fig. 1 is set with its axis substantially horizontal, and the nose slopes downwardly to the nozzle, which discharges in a downwardly inclined direction. In some instances, however, it may be preferable to incline the whole burner as illustrated in Fig. 12, in which event the bottom of the nose or conduit 59 extends substantially parallel with the axis of the burner body. The nozzle discharges in a downwardly inclined direction at substantially the same angle as in the form shown in Fig. 1.

In the operation of my invention, the hopper gates having been opened the desired amount, the fuel in the hopper, which is prevented from arching by the chain 10, falls by gravity into the trough 14 where it is broken up, agitated, and mixed to a uniform consistency by the agitator fingers 18, from which trough it is fed by the feed screw 19 into perforated cylinder 34. Here it is partitally mixed with air entering under pressure through the perforations in the cylinder 34 into the shell 31, from whence it is delivered through the neck 36 into the burner. It is to be understood, however, that while in the preferred form of this invention it is found desirable to perform the work of diffusing the dust through the air in two steps, the first being with preliminary air at the feed screw and the second with the diffusing air projecting through the air conduit, it is nevertheless possible to do the diffusing in one operation, that is, solely with the air projected through the orifices in the air conduits and the hopper feeding substantially only fuel dust therethrough. Air under suitable pressure entering the burner at the intake end 57 is discharged radially outwardly in jets which intersect the flowing streams of fuel and air, agitate the same and cause the fuel to be thoroughly commingled with the requisite amount of air. From the burner the combustible mixture of fuel and air is delivered by the nozzle into the combustion chamber.

The details of construction shown and described may be varied within wide limits without departing from the essence of the invention, as defined in the following claims.

I claim:

1. In an apparatus for feeding powdered fuel, the combination of means for preliminarily mixing fuel and air, a burner for admixing further air under pressure with said mixture of fuel and air, said burner comprising walls forming a series of annular mixing conduits of increasing cross-sectional area from their intake to their delivery ends, and a series of air supply conduits each of decreasing cross-sectional area from its intake to its delivery end, and means for delivering the resultant mixture to a point of use.

2. In an apparatus for feeding powdered fuel, annular walls forming a plurality of concentrically arranged mixing conduits disposed in alternation with a plurality of concentrically arranged air supply conduits, said walls having perforations therein to permit the discharge of air under pressure from the air supply conduits outward radially and into the said mixing conduits, said mixing conduits being of increasing cross sectional area and said air supply conduits being of decreasing cross sectional area from their intake towards their delivery ends, respectively, means for supplying a mixture of fuel and air to the mixing conduits, and means for supplying air under pressure to the air supply conduits.

3. In an apparatus of the character described, the combination of a plurality of concentrically disposed mixing conduits of increasing cross-sectional area from their intake toward their delivery ends, and means for delivering air under pressure radially outwardly into each of said conduits.

4. An apparatus of the character described, annular walls providing mixing conduits arranged concentrically in alternation with a plurality of annular air supply conduits, said walls between said conduits being inclined with respect to the longitudinal axes of the conduits whereby the cross sectional areas of the mixing conduits are increased, and the cross sectional areas of the air supply conduits are decreased from their intake towards their delivery ends, respectively, certain of said walls being provided with perforations to permit the radial projection of air jets outwardly from the supply conduits into the mixing conduits.

5. In an apparatus of the character described, the combination of a plurality of concentrically arranged air and mixture conduits, certain of the walls between said conduits being perforated to permit the delivery of jets of air from the air conduits radially outwardly into the mixture conduits, and means for capping the ends of the air conduits remote from their intake ends, said means being provided with apertures permitting the discharge of solid particles which may enter said air conduits.

6. In an apparatus of the character described, the combination of a plurality of concentrically arranged annular members providing alternate air and mixture conduits, the mixture conduits being closed at their intake ends and the air conduits being capped at their delivery ends and provided with a plurality of longitudinally opening cleaning apertures.

7. In an apparatus of the character described, annular walls providing a plurality of concentrically arranged mixing conduits, each surrounding a concentric air supply conduit, certain of said walls between the said conduits being provided with perforations to permit radial projection of air jets from the supply conduits outwardly into the surrounding mixing conduits, said conduits having certain thereof decreasing in cross section and others thereof increasing in cross section from their intake toward their discharge ends.

8. In an apparatus of the character described, the combination of a series of elongated hollow members approximately concentrically arranged providing a series of annular conduits, alternate conduits increasing in cross section, while the other conduits decrease in cross section toward their delivery ends, means for delivering a mixture of air and fuel to the alternate conduits, means for separately delivering air under pressure to the other conduits, and tapered ends on the latter conduits.

9. In an apparatus of the character described, the combination of a series of annular walls successively arranged one within another providing a series of annular conduits, alternate conduits increasing in cross section and the intervening conduits decreasing in cross section toward their delivery ends, means for delivering a mixture of air and fuel to the alternate conduits, and means for separately delivering air under pressure to the intervening conduits.

10. In an apparatus of the character described, the combination of a plurality of annular walls successively arranged one within another providing a plurality of annular conduits, means for delivering fuel to alternate conduits, means for delivering air to the intervening conduits and tapered ends on the latter conduits, said ends being provided with discharge openings.

11. In an apparatus of the character described, the combination of a plurality of mixing conduits one within the other of increasing cross-sectional area from their intake toward their delivery ends, and means for delivering air under pressure outwardly into each of said conduits.

12. In an apparatus of the character described, the combination of a mixing conduit of increasing cross-sectional area from its intake end toward its delivery end, and means for delivering air outwardly into said conduit at substantially equal pressures throughout its length.

13. The process of preparing and feeding powdered fuel which consists of mixing the fuel before delivery to the furnace with the requisite amount of air to support substantially complete combustion by mixing the major portion of the air with the fuel by passing the air through a surrounding stream of fuel and causing the air to expand outwardly into said stream of fuel at equal pressures throughout the mixing operation.

14. The process of preparing and feeding powdered fuel which consists of mixing the fuel before delivery to the furnace with the requisite amount of air to support substantially complete combustion by mixing the major portion of the air with the fuel by passing the air through a surrounding stream of fuel and causing the air to expand outwardly into said stream of fuel at equal pressures throughout the mixing operation and allowing the mixture to expand.

15. The process of preparing and feeding powdered fuel which consists of mixing the major portion of the air with the fuel by passing the air through a surrounding stream of fuel and causing the air to expand outwardly into said stream of fuel at equal pressures throughout the mixing operation.

MILTON W. ARROWOOD.